United States Patent
Venkatesh

(10) Patent No.: US 10,742,628 B2
(45) Date of Patent: Aug. 11, 2020

(54) SECURED CLOUD STORAGE BROKER WITH ENHANCED SECURITY

(71) Applicant: Prithvi B Venkatesh, Bangalore Karnataka (IN)

(72) Inventor: Prithvi B Venkatesh, Bangalore Karnataka (IN)

(73) Assignee: Unisys Corporation, Blue Bell, PA (US)

( * ) Notice: Subject to any disclaimer, the term of this patent is extended or adjusted under 35 U.S.C. 154(b) by 114 days.

(21) Appl. No.: 15/234,074

(22) Filed: Aug. 11, 2016

(65) Prior Publication Data

US 2018/0046586 A1    Feb. 15, 2018

(51) Int. Cl.
*H04L 29/06* (2006.01)
*G06F 21/62* (2013.01)
*G06F 3/06* (2006.01)

(52) U.S. Cl.
CPC .............. *H04L 63/08* (2013.01); *G06F 3/065* (2013.01); *G06F 3/067* (2013.01); *G06F 3/0619* (2013.01); *G06F 3/0623* (2013.01); *G06F 21/6218* (2013.01); *H04L 63/0428* (2013.01)

(58) Field of Classification Search
CPC .............................. G06F 12/1408; H04L 63/08
USPC ......................................................... 713/193
See application file for complete search history.

(56) References Cited

U.S. PATENT DOCUMENTS

| | | | |
|---|---|---|---|
| 6,532,079 B1 * | 3/2003 | Serex | H04N 1/32128 358/1.13 |
| 9,600,677 B2 * | 3/2017 | Mori | G06F 21/6227 |
| 2011/0293096 A1 * | 12/2011 | Reilly | H04L 9/0833 380/277 |
| 2012/0134494 A1 * | 5/2012 | Liu | G06F 21/6218 380/44 |
| 2014/0258731 A1 * | 9/2014 | Chia | G06F 21/602 713/189 |
| 2015/0039885 A1 * | 2/2015 | Cash | G06F 21/6227 713/165 |
| 2017/0331880 A1 * | 11/2017 | Crofton | H04L 67/06 |

* cited by examiner

*Primary Examiner* — Peter C Shaw

(57) ABSTRACT

An apparatus includes a memory and a processor of a secured cloud storage broker (SCSB) coupled to the memory. The processor is configured to perform the steps of: receiving a request from a user to deposit data; confirming whether the user provides appropriate credentials; authenticating the request; generating a first unique combination of an internet storage provider ID, a subscription account, a storage location, a storage account, and a file directory; generating a second unique combination of a file ID, an encryption algorithm, and a key; encrypting the data using the encryption algorithm and the key; and sending the encrypted data to the file directory for storage.

17 Claims, 10 Drawing Sheets

SECURED CLOUD STORAGE BROKER WITH ENHANCED SECURITY

FIELD OF THE DISCLOSURE

The instant disclosure relates generally to internet massive data storage. More specifically, this disclosure relates to embodiments of apparatuses, systems, and methods that enhance the security of the internet massive data storage.

BACKGROUND

More and more data storages are provided over internet, instead of storing the data at local computers. Cloud storage is one of such example. However, accessing and depositing data over internet are vulnerable in many aspects. For example, if all the data is stored with one cloud storage provider, the data may be inaccessible if that service provider experience a service outage or, even worse, went out of business. In another example, an internet storage provider may experience a security breach and the data stored with the provider may be compromised. Apparatuses, systems, and methods disclosed herein provide solutions to increase the securities for storing data over internet.

SUMMARY

The instant disclosure relates generally to internet massive data storage. More specifically, this disclosure relates to embodiments of apparatuses, systems, and methods that enhance the security of the internet massive data storage. According to one embodiment, a method includes steps: receiving, at a processor of a storage broker, a request from a user to deposit data; confirming, by the processor, whether the user provides appropriate credentials; authenticating, by the processor, the request; generating, by the processor, a first unique combination of an internet storage provider ID, a subscription account, a storage location, a storage account, and a file directory, wherein the first unique combination is generated with a random selection process that follows a first probability density function; generating, by the processor, a second unique combination of a file ID, an encryption algorithm, and a key, wherein the second unique combination is generated with a random selection process that follows a second probability density function; encrypting, by the processor, the data using the encryption algorithm and the key; and sending, by the processor, the encrypted data to the file directory for storage.

According to another embodiment, a computer program product includes a non-transitory computer-readable medium comprising instructions which, when executed by a processor of a storage broker, causes the processor to perform the steps of: receiving a request from a user to deposit data; confirming whether the user provides appropriate credentials; authenticating the request; generating a first unique combination of an internet storage provider ID, a subscription account, a storage location, a storage account, and a file directory, wherein the first unique combination is generated with a random selection process that follows a first probability density function; generating a second unique combination of a file ID, an encryption algorithm, and a key, wherein the second unique combination is generated with a random selection process that follows a second probability density function; encrypting the data using the encryption algorithm and the key; and sending the encrypted data to the file directory for storage.

According to another embodiment, an apparatus includes a memory and a processor of a storage broker coupled to the memory. The processor is configured to perform the steps of: receiving a request from a user to deposit data; confirming whether the user provides appropriate credentials; authenticating the request; generating a first unique combination of an internet storage provider ID, a subscription account, a storage location, a storage account, and a file directory, wherein the first unique combination is generated with a random selection process that follows a first probability density function; generating a second unique combination of a file ID, an encryption algorithm, and a key, wherein the second unique combination is generated with a random selection process that follows a second probability density function; encrypting the data using the encryption algorithm and the key; and sending the encrypted data to the file directory for storage.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

The term "secured cloud storage broker (SCSB)" and "storage broker" are used interchangeably. Various aspects and embodiments of an SCSB are disclosed herein in this specification.

The term "module" refers to instructions and/or accompanying hardware. Various modules for specific tasks are disclosed herein, e.g., user interface module, identity and access management module, file mapping module, random selection module, file mapping module, file encryption/description module, internet storage managing module, etc. The specific structures and functions of each module are discussed in further details in the applicable embodiments disclosed herein. The instructions of a module can be executed by one or more processors. In one embodiment, a module may have its own processor. In another embodiment, a module may share a processor with one or more other modules.

The term "random" is used herein as accustomed to the technical field of mathematics in probability theory and statistics. A random selection process may refer to a selection process that involves a certain probability density function, e.g., normal distribution, uniform distribution, etc. In one example, a random selection process follows a probability density function that is uniform distribution for selecting A, B, C, or D, such that the probability that each of A, B, C, or D has a 25% probability of being selected in every selection.

The term "instruction" means a processor-executable instruction, for example, an instruction written as programming codes. An instruction may be executed by any suitable processor, for example, x86 processor. An instruction may be programmed in any suitable computer language, for example, machine codes, assembly language codes, C language codes, C++ language codes, Fortran codes, Java codes, Matlab codes, or the like. All methods, software and emulated hardware disclosed in this disclosure can be implemented as instructions.

Steps of methods, e.g., methods 200, 300, 400, and 500 may be implemented as processor-executable instructions, for example, instructions written as programming codes. An instruction may be executed by any suitable processor, for example, x86 processors. An instruction may be programmed in any suitable computer language, for example, machine codes, assembly language codes, C language codes, COBOL codes, C++ language codes, Fortran codes, Java codes, Matlab codes, or the like. The sequences of the steps of the methods 200 and 300 may be changed without departing the scope of the disclosure.

Figure 1:
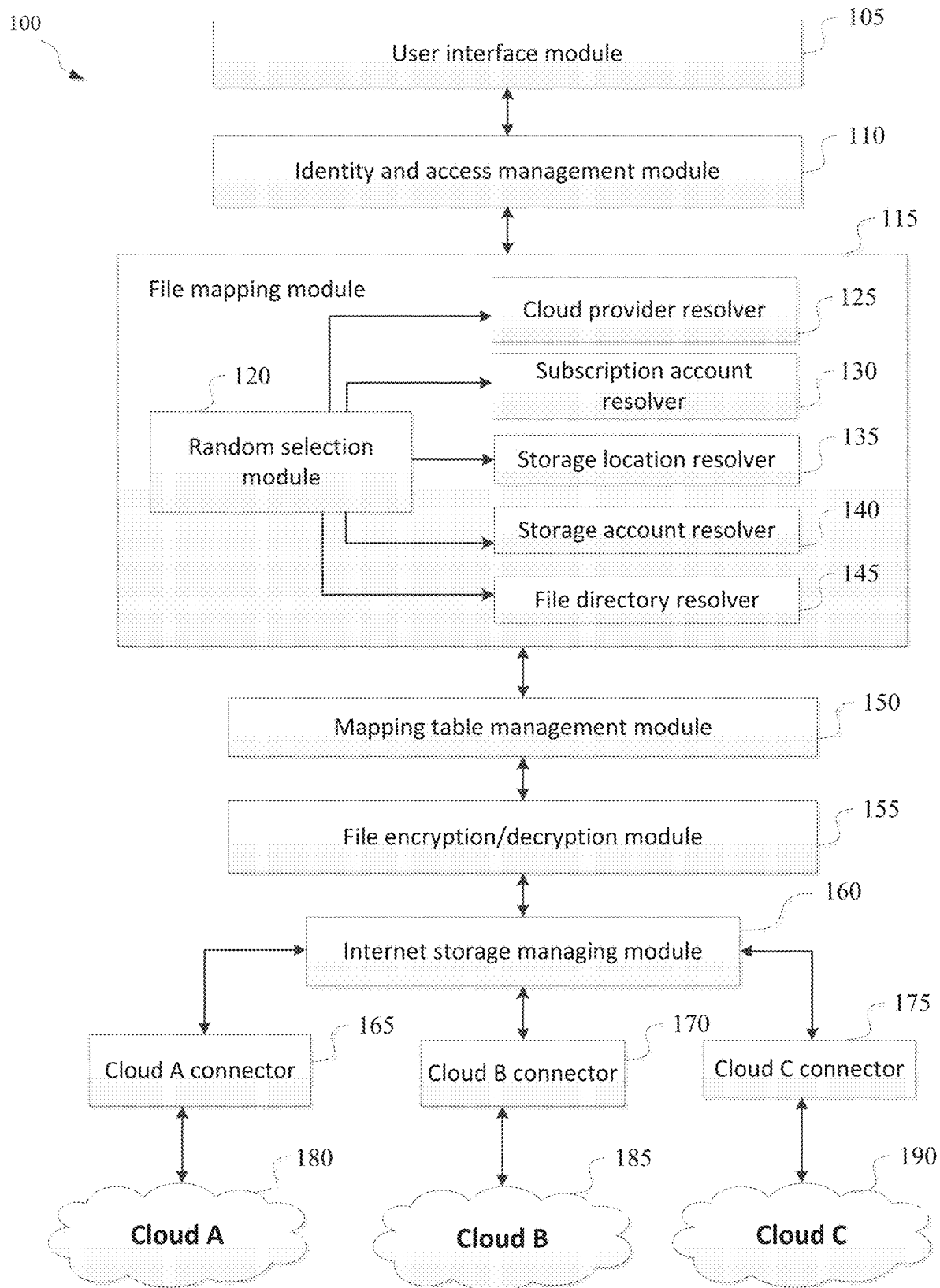
FIG. 1 shows a schematic block diagram of a secured cloud storage broker (SCSB) according to one embodiment of the disclosure.

FIG. 1 shows a schematic block diagram of a secured cloud storage broker (SCSB) 100 according to one embodiment of the disclosure. The SCSB 100 may implement the method 200 in FIG. 2. The SCSB 100 may implement the method 300 in FIG. 3. The SCSB 100 may implement the method 400 in FIG. 4. The SCSB 100 may implement the encryption process 500 for the mapping table 505 in FIG. 5. The SCSB 100 may include the data structures 600 of a cell of a mapping table in FIG. 6. The SCSB 100 may implement the graphical user interface 700 in FIG. 7. The SCSB 100 may be used in the computer network 800 in FIG. 8. The SCSB 100 may be used in the computer system 900 in FIG. 9. The SCSB 100 may be used in the servers 1000, 1050 in FIGS. 10A and 10B, respectively.

As shown in FIG. 1, the SCSB 100 includes an user interface module 105. In one embodiment, the user interface module 105 may allow a user to request deposition of data. In one embodiment, the user interface module 105 may allow a user to request access of data. In one embodiment, the user interface module 105 may include the graphical user interface 700 in FIG. 7.

As shown in FIG. 1, the SCSB 100 includes an identity and access management module 110. The identity and access management module 110 may confirm the identity of the user by checking the credentials provided by the user, e.g., username, password, social security number (SSN), IP address, media access control (MAC) address, etc.

After confirming the identity of a user, the identity and access management module 110 may also determine the authority of the user. For example, whether the user has the authority to create, write, rewrite, delete, and/or move a data file or a file directory. In one embodiment, depending on which internet storage provider (e.g. cloud provider) is selected by the SCSB 100, the user may have different authorities.

In another embodiment, the user's authority may also be affected by how many other users are simultaneously using the SCSB 100). For example, if the maximum number of users that SCSB 100 can serve simultaneously is ten. The eleventh user logged in the SCSB 100 may be temporarily prohibited from making a certain request which he would normally allowed to do.

As shown in FIG. 1, the SCSB 100 includes a file mapping module 115. The file mapping module 115 includes a random selection module 120, a cloud provider resolver 125, a subscription account resolver 130, a storage location resolver 135, a storage account resolver 140, and a file directory resolver 145.

In one embodiment, when the user request is to deposit a data file, the file mapping module 115 may randomly select a cloud provider from a pool of cloud providers through the cloud provider resolver 125. The random selection process is assisted by the random selection module 120. The random selection module 120 may process the random selection following a certain probability density function, e.g., normal distribution, uniform distribution, etc.

In one embodiment, for example, the pool of cloud providers may include Amazon Web Services (AWS) cloud, Microsoft Azure cloud, Dropbox cloud, Google cloud, etc. The random selection of the cloud providers follows a probability density function that is uniform distribution, i.e., the probability that each cloud provider being selected is the same.

In one embodiment, the file mapping module 115 may randomly select a subscription account from a plurality of subscription accounts through the subscription account resolver 130. The random selection process of the subscription account may be assisted by the random selection module 120. The random selection module 120 may process the random selection following a certain probability density function, e.g., normal distribution, uniform distribution, etc.

In one embodiment, a user may maintain a plurality of subscription accounts with a cloud provider. The random selection of the subscription account follows a probability density function that is uniform distribution, i.e., the probability that each account being selected is the same.

In one embodiment, the file mapping module 115 may randomly select a storage location provided by the cloud provider from a plurality of storage locations through the storage location resolver 135. The random selection process may be assisted by the random selection module 120. The random selection module 120 may process the random selection following a certain probability density function, e.g., normal distribution, uniform distribution, etc.

In one embodiment, the cloud provider has multiple storage locations/data centers, e.g., Texas, Singapore, etc. The random selection of the storage location follows a probability density function that is uniform distribution, i.e., the probability that each storage location being selected is the same.

In one embodiment, the file mapping module 115 may randomly select a storage account from a plurality of storage accounts through the storage account resolver 140. The random selection process is assisted by the random selection module 120. The random selection module 120 may process the random selection following a certain probability density function, e.g., normal distribution, uniform distribution, etc.

In one embodiment, under a subscription account, a user may maintain a plurality of storage accounts, e.g., [storage account 1, storage account 2, storage account 3]. The random selection of the storage account follows a probability density function that is uniform distribution, i.e., the probability that each storage account being selected is the same.

In one embodiment, the file mapping module 115 may randomly select a file directory from a plurality of file directories through the file directory resolver 145. The random selection process is assisted by the random selection module 120. The random selection module 120 may process the random selection following a certain probability density function, e.g., normal distribution, uniform distribution, etc.

In one embodiment, under a storage account, a user may maintain a plurality of file directories, e.g., [directory 1, directory 2, directory 3]. The random selection of the file directory follows a probability density function that is uniform distribution, i.e., the probability that each file directory being selected is the same.

The mapping table management module 150 may maintain a mapping table keeping tracks of all the selections made by the file mapping module 115, e.g., cloud provider, subscription account, storage location, storage account, file directory, etc. The mapping table may have a plurality of cells. Each cell includes all relevant information about a specific request, e.g., depositing data or retrieving data, made by the user. In one embodiment, the mapping table may be the mapping table 505 in FIG. 5.

In one embodiment, the mapping table management module 150 may encrypt the mapping table. In another embodiment, the mapping table management module 150 may encrypt each cell of the mapping table with different encrypting algorithms. In yet another embodiment, the mapping table management module 150 may re-encrypt the mapping table with different encrypting algorithms following a planned time schedule. In yet another embodiment, the mapping table management module 150 may re-encrypt each cell of the mapping table with different encrypting algorithms, wherein each cell has its own re-encrypting time schedule. In one embodiment, the re-encrypting process can be done at a fixed frequency, e.g., every 30 minutes, every 4 hours, every day, every week, every month, etc. In another embodiment, the re-encrypting process can follow a time schedule that does not have a fixed frequency, e.g., higher re-encrypting frequency around a specific time of a day, or a specific day of the week, etc.

In another embodiment, the mapping table management module 150 may maintain another table, e.g., an encryption table for the mapping table, to track which cell of the mapping table is encrypted with which encrypting algorithm and encrypting key. In one embodiment, such table is the encryption table for the mapping table 550 in FIG. 5. The encryption table for the mapping table is updated every time any cell of the mapping table is re-encrypted.

The file encryption/decryption module 155 encrypts and/or decrypts the data file. In the case the user made a request to deposit the data file, the file encryption/decryption module 155 encrypts the data file. In the case the user made a request to retrieve the data file, the file encryption/decryption module 155 decrypts the data file.

In one embodiment, the encrypting algorithm and the encrypting key used by the file encryption/decryption module 155 to encrypt a data file may be saved in the mapping table maintained by the mapping table management module 150.

At this point, in the case a user is requesting to deposit a data file, the request is processed with a unique combination of: cloud provider, subscription account, storage location, storage account, file directory, encryption algorithm, and encryption key. Such methods of depositing the data file may notably improve the security level by storing data over internet.

The internet storage managing module 160 may serve as an interface between the SCSB 100 and the cloud providers, e.g., cloud A 180, cloud B 185, and cloud C 190. In the case of depositing data to the cloud providers, the internet storage managing module 160 may direct the encrypted file to the designated cloud provider, subscription account, storage location, storage account, and file directory. In the case of retrieving data from a cloud provider, the internet storage managing module 160 may retrieve data files from the designated cloud provider, subscription account, storage location, storage account, and file directory.

In some embodiments, different cloud providers may require different connectors to communicate. For example, Amazon may require a specific software to make the data depositing or retrieving communication, so does Microsoft, Dropbox, etc. In one embodiment, Cloud A 180 requires Cloud A connector 165 to communicate. In one embodiment, Cloud B 185 requires Cloud B connector 170 to communicate. In another embodiment, Cloud C 190 requires Cloud C connector 175 to communicate.

Figure 2:
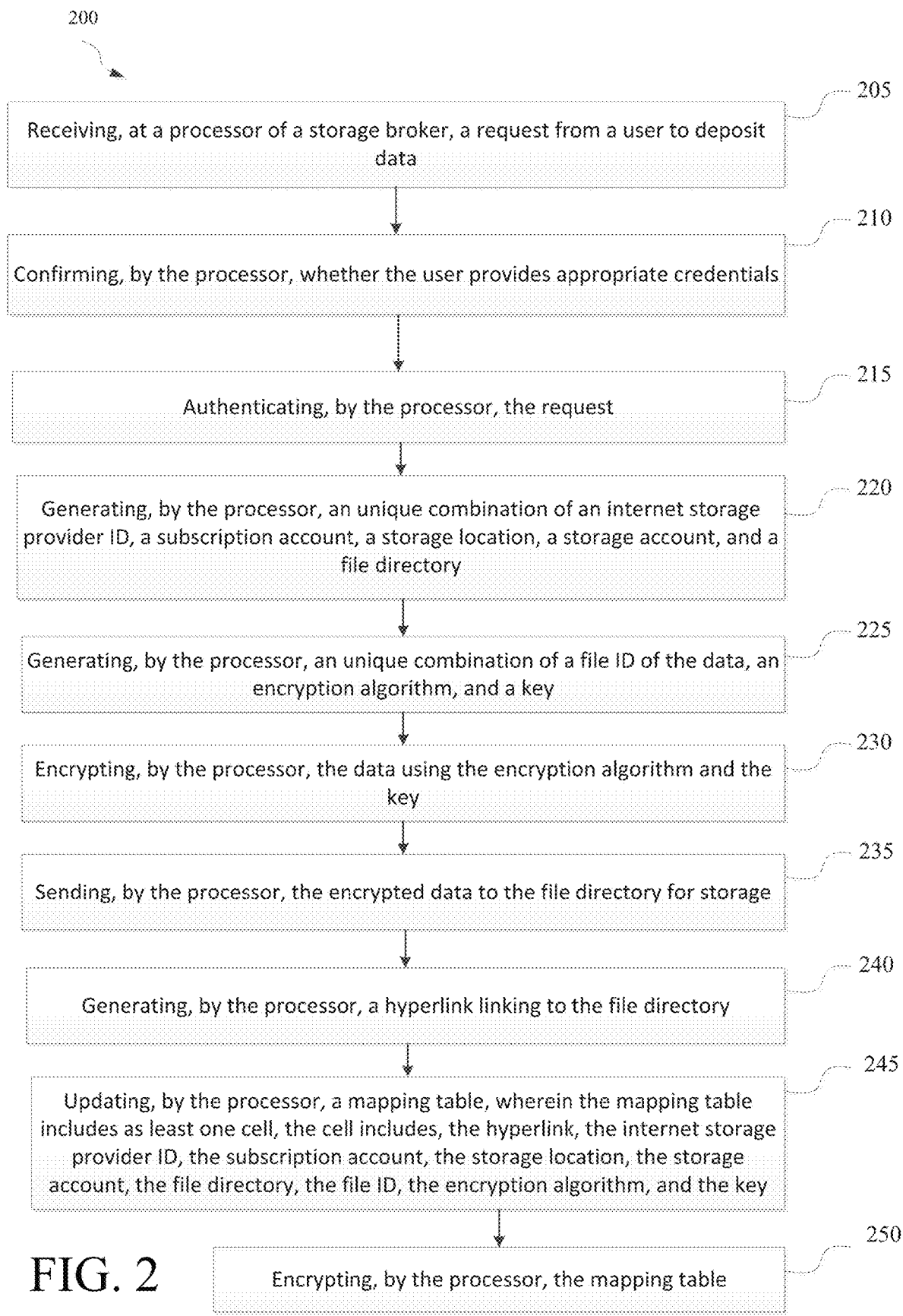
FIG. 2 shows a method for depositing data through SCSB according to one embodiment of the disclosure.

FIG. 2 shows a method 200 for depositing data through SCSB according to one embodiment of the disclosure. The method 200 may be implemented by the SCSB 100 in FIG. 1. The method 200 may be used in combination with the method 300 in FIG. 3. The method 200 may be used in combination with the method 400 in FIG. 4. The method 200 may be used in combination with the encryption process 500 for the mapping table 505 in FIG. 5. The method 200 may include the data structures 600 of a cell of a mapping table in FIG. 6. The method 200 may be used in combination with the graphical user interface 700 in FIG. 7. The method 200 may be implemented in the computer network 800 in FIG. 8. The method 200 may be implemented in the computer system 900 in FIG. 9. The method 200 may be implemented in the servers 1000, 1050 in FIGS. 10A and 10B, respectively.

As shown in FIG. 2, the method 200 includes receiving, at a processor of a storage broker, a request from a user to deposit data 205. In one embodiment, the request is made through electronic communication means. The storage broker in the method 200 may include all of the structures and functions of the SCSB 100 in FIG. 1.

The method 200 proceeds to confirming, by the processor, whether the user provides appropriate credentials 210. In one embodiment, the credentials may include a public key and a private key, wherein the public key may identify a company and the private key may identify an individual employee in the company. In another embodiment, the credentials may include user ID, Key ID, user name, password, social security number (SSN), etc. In one embodiment, the credentials may be saved in the data structures 600 in FIG. 6.

The method 200 proceeds to authenticating, by the processor, the request 215. Once the user's credentials are confirmed, the storage broker may authenticate the request.

The method 200 proceeds to generating an unique combination of an internet storage provider identification (ID), a subscription account, a storage location, a storage account, and a file directory 220. In one embodiment, at step 220, the storage broker may randomly select an internet storage provider, a subscription account with the internet storage provider, a storage location supported by the internet storage provider, a storage account under the subscription account, and a specific file directory under the storage account. In one embodiment, the random selection process may follow a probability distribution expressed in a probability density function. In one embodiment, the step 220 includes the structures and functions of the file mapping module 115 in FIG. 1. In one embodiment, the information of the internet storage provider identification (ID), the subscription account, the storage location, the storage account, and the file directory may be saved in the data structures 600 in FIG. 6

The method 200 proceeds to generating, by the processor, an unique combination of a file ID of the data, an encryption algorithm, and a key 225. In one embodiment, at 225, the storage broker may randomly select a file ID of the data to be deposited, an encryption algorithm to encrypt the data, and a key to encrypt the data. In one embodiment, the random selection process may follow a probability distribution expressed in a probability density function. In one embodiment, the step 225 includes the structures and functions of the file encryption/decryption module 155 in FIG. 1. In one embodiment, the information of the file ID, the encryption algorithm, and the key may be saved in the data structures 600 in FIG. 6.

The method 200 proceeds to encrypting, by the processor, the data using the encryption algorithm and the key 230. In one embodiment, because each data file is encrypted by a randomly selected algorithm, each data file may be encrypted with a different algorithm. This effectively increases the difficulties for hackers to breach the data.

The method 200 proceeds to sending, by the processor, the encrypted data to the file directory for storage 235.

The method 200 proceeds to generating, by the processor, a hyperlink linking to the file directory 240. In one embodiment, as an example, the hyperlink may be in the form of [internet storage provider]\[subscription account]\[storage location]\[storage account][file directory]\[file ID]. The hyperlink at 240 may be saved in the data structures 600 in FIG. 6.

The method 200 proceeds to updating, by the processor, a mapping table, wherein the mapping table includes at least one cell, the cell includes, the hyperlink, the internet storage provider ID, the subscription account, the storage location, the storage account, the file directory, the file ID, the encryption algorithm, and the key 245. In one embodiment, the mapping table at 245 may be the mapping table 505 in FIG. 5. In another embodiment, the cell at 245 may be any of the cells 510, 515, 520, 525, 530, 535 in FIG. 5. In one embodiment, the hyperlink, the internet storage provider ID, the subscription account, the storage location, the storage account, the file directory, the file ID, the encryption algorithm, and the key at 245 can be saved in the data structures 600 in FIG. 6.

The method 200 proceeds to encrypting, by the processor the mapping table 250. In one embodiment, the step of 250 includes the structures and functions of the mapping table management module 150 in FIG. 1. In one embodiment, the method 200 at 250 may encrypt the mapping table with one encryption algorithm. In another embodiment, the method 200 at 250 may encrypt each cell of the mapping table with different encrypting algorithms. In yet another embodiment, the method 200 at 250 may re-encrypt the mapping table with different encrypting algorithms following a re-encrypting time schedule. In yet another embodiment, the mapping table management module 150 may re-encrypt each cell of the mapping table with different encrypting algorithms, wherein each cell has its own re-encrypting time schedule. In one embodiment, the re-encrypting process can be done at a fixed frequency, e.g., every 30 minutes, every 4 hours, every day, every week, every month, etc. In another embodiment, the re-encrypting process can follow a time schedule that has varying frequencies, e.g., higher re-encrypting frequency around a specific day of the week, etc.

Figure 3:
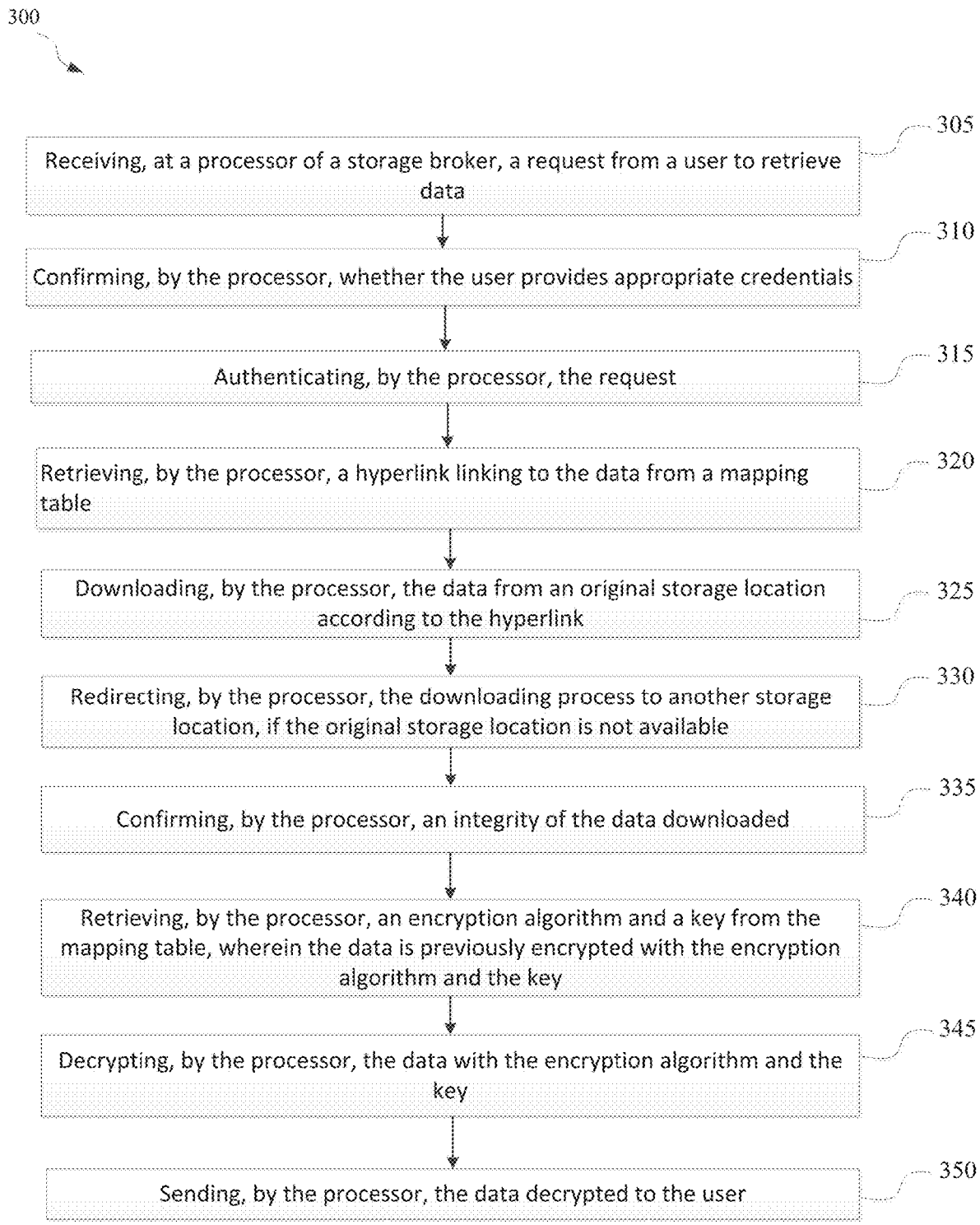
FIG. 3 shows a method for retrieving data through SCSB according to one embodiment of the disclosure.

FIG. 3 shows a method 300 for retrieving data through SCSB according to one embodiment of the disclosure. The method 300 may be implemented by the SCSB 100 in FIG. 1. The method 300 may be used in combination with the method 200 in FIG. 2. The method 300 may be used in combination with the method 400 in FIG. 4. The method 300 may be used in combination with the encryption process 500 for the mapping table 505 in FIG. 5. The method 300 may include the data structures 600 of a cell of a mapping table in FIG. 6. The method 300 may be used in combination with the graphical user interface 700 in FIG. 7. The method 300 may be implemented in the computer network 800 in FIG. 8. The method 300 may be implemented in the computer system 900 in FIG. 9. The method 300 may be implemented in the servers 1000, 1050 in FIGS. 10A and 10B, respectively.

The method 300 includes receiving, at a processor of a storage broker, a request from a user to retrieve data 305.

The method 300 proceeds to confirming, by the processor, whether the user provides appropriate credentials 310. In one embodiment, the step of 310 may be similar to the step of 210.

The method 300 proceeds to authenticating, by the processor, the request 315. In one embodiment, the step of 315 may be similar to the step of 215.

The method 300 proceeds to retrieving, by the processor, a hyperlink linking to the data from a mapping table 320. In one embodiment, the hyperlink at 320 may be generated at 240 in FIG. 2. In one embodiment, the mapping table at 320 may be the mapping table 505 in FIG. 5.

The method 300 proceeds to downloading, by the processor, the data from an original storage location according to the hyperlink 325. In one embodiment, the original storage location at 325 may be the storage location randomly selected at 220 in FIG. 2. In one embodiment, the original storage location at 325 may be a primary location of a data center managed by the internet storage provider.

The method 300 proceeds to redirecting, by the processor, the downloading process to another storage location, if the original storage location is not available 330. In one embodiment, it is possible that an internet storage provider maintains several data centers at different physical locations. The internet storage provider may keep multiple copies of a single data file in different data centers to prevent loss of data if one data center experiences an outage. Thus, for example, if the original storage location at 325 is not available, the storage broker may direct the downloading process to another back up storage location at 330.

The method 300 proceeds to confirming, by the processor, an integrity of the data downloaded 335. In one embodiment, the integrity of the data downloaded can be confirmed by checking the checksum. In one embodiment, the checksum of the original data file previously deposited can be saved in the data structures 600 in FIG. 6. In one embodiment, if the checksum of the data file downloaded is different than the data file previously deposited, then the storage broker may reinitiate the downloading process.

The method 300 proceeds to retrieving, by the processor, an encryption algorithm and a key from the mapping table, wherein the data is previously encrypted with the encryption algorithm and the key 340. In one embodiment, the encryption algorithm and the key may be stored in the data structures 600 in FIG. 6. In one embodiment, the mapping table at 340 is the mapping table 505 in FIG. 5.

The method 300 proceeds to decrypting, by the processor, the data with the encryption algorithm and the key 345.

The method 300 proceeds to sending, by the processor, the data decrypted to the user 350.

Figure 4:
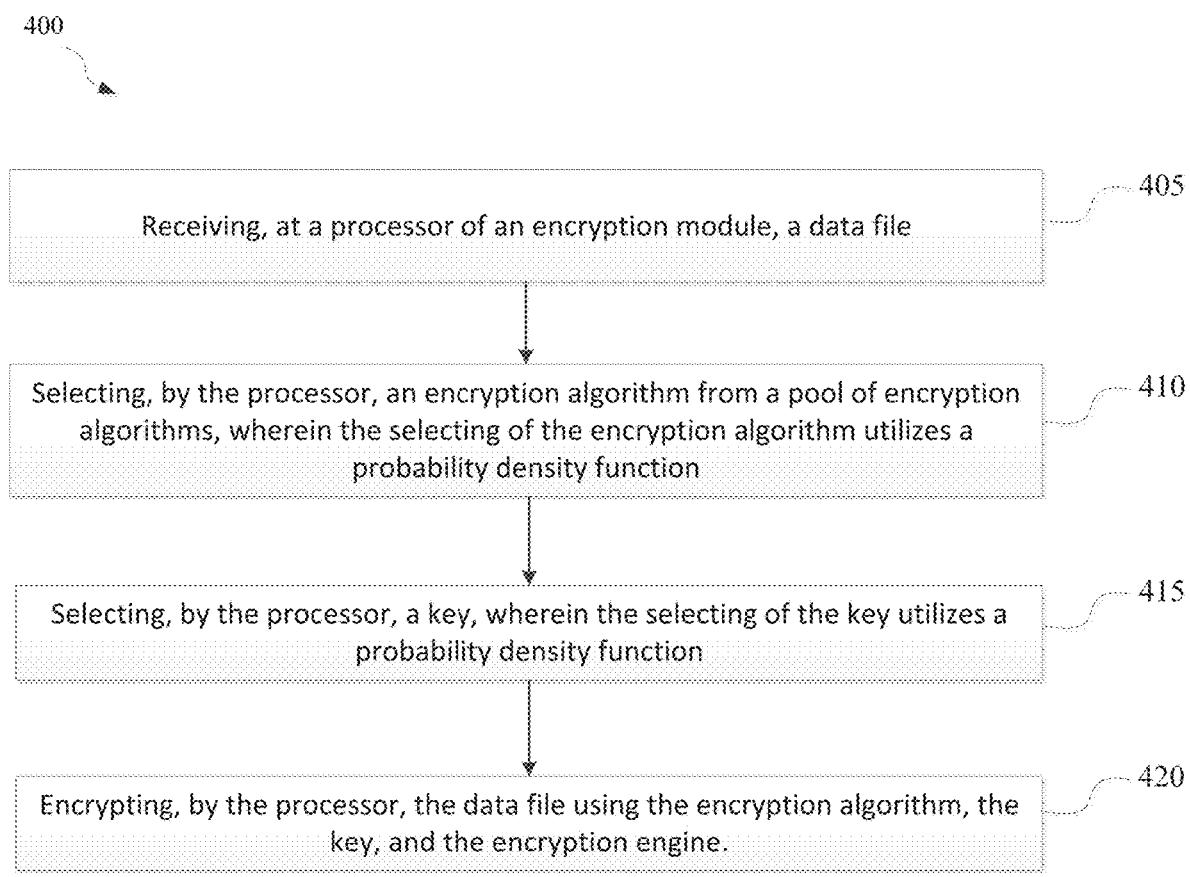
FIG. 4 shows a method for encrypting a data file using a probability density function according to one embodiment of the disclosure.

FIG. 4 shows a method 400 for encrypting a data file using a probability density function according to one embodiment of the disclosure. The method 400 may be implemented by the SCSB 100 in FIG. 1. The method 400 may be used in combination with the method 200 in FIG. 2. The method 400 may be used in combination with the method 300 in FIG. 3. The method 400 may be used in combination with the encryption process 500 for the mapping table 505 in FIG. 5. The method 400 may include the data structures 600 of a cell of a mapping table in FIG. 6. The method 400 may be used in combination with the graphical user interface 700 in FIG. 7. The method 400 may be implemented in the computer network 800 in FIG. 8. The method 400 may be implemented in the computer system 900 in FIG. 9. The method 400 may be implemented in the servers 1000, 1050 in FIGS. 10A and 10B, respectively.

The method 400 includes receiving, at a processor of an encryption module, a data file 405. The encryption module at 405 may include all the structures and functions of the file encryption/decryption module 155 in FIG. 1.

The method 400 proceeds to selecting, by the processor, an encryption algorithm from a pool of encryption algorithms, wherein the selecting of the encryption algorithm utilizes a probability density function 410. In one embodiment, the pool of encryption algorithms includes [DES 256 bit, Triple DES, AES 256 bit, Salsa 20], wherein the probability of each algorithm being selected is the same, e.g., an uniform distribution probability density function.

The method 400 proceeds to selecting, by the processor, a key, wherein the selecting of the key unitizes a probability density function 415.

The method 400 proceeds to encrypting, by the processor, the data file using the encryption algorithm, the key, and the encryption engine 420.

Figure 5:
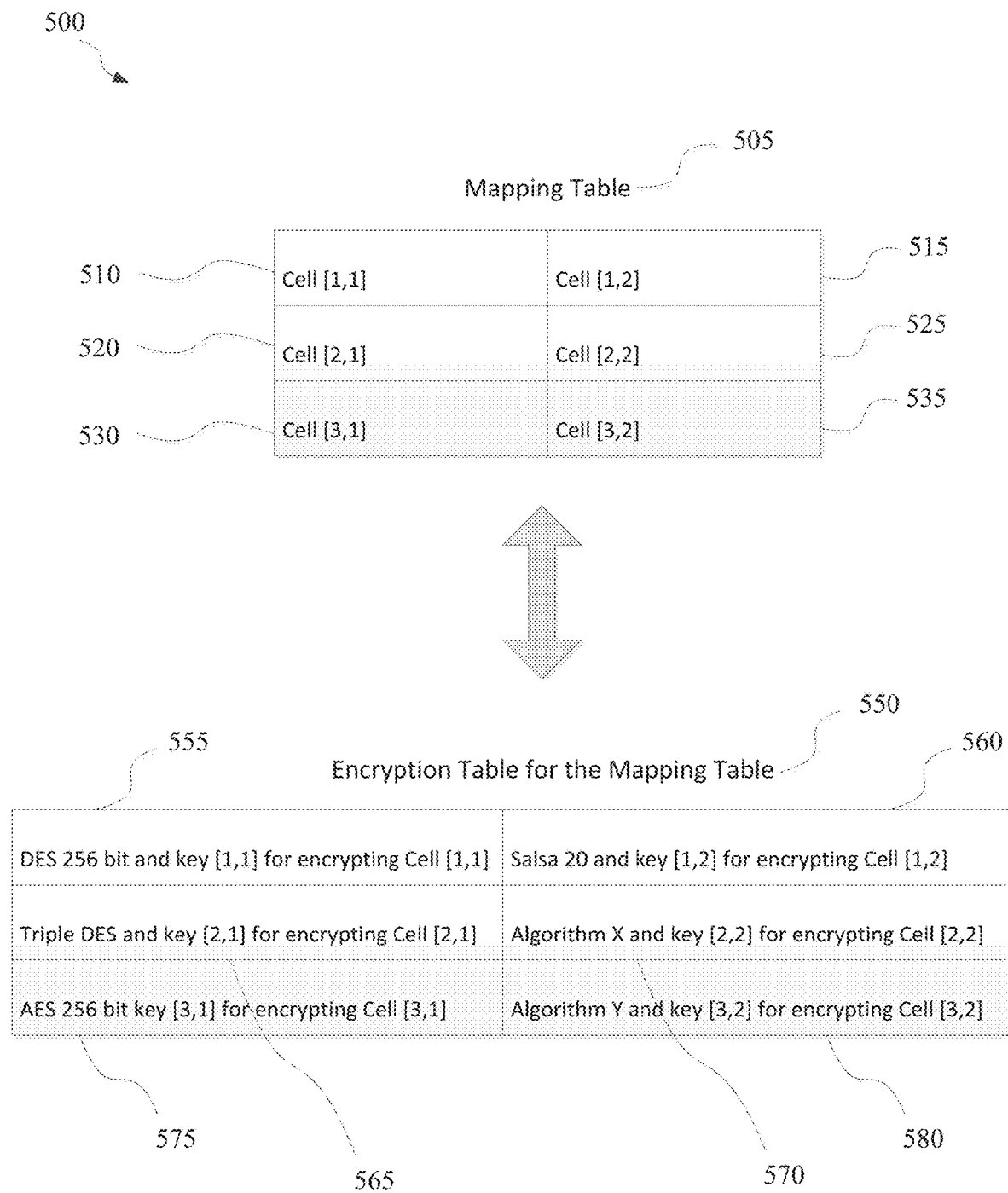
FIG. 5 is a schematic diagram showing an encryption process for the mapping table according to one embodiment of the disclosure.

FIG. 5 is a schematic diagram showing an encryption process 500 for the mapping table according to one embodiment of the disclosure. The encryption process 500 may be implemented by the SCSB 100 in FIG. 1. The encryption process 500 may be used in combination with the method 200 in FIG. 2. The encryption process 500 may be used in combination with the method 300 in FIG. 3. The encryption process 500 may be used in combination with the method 400 in FIG. 4. The encryption process 500 may include the data structures 600 of a cell of a mapping table in FIG. 6. The encryption process 500 may be used in combination with the graphical user interface 700 in FIG. 7. The encryption process 500 may be implemented in the computer network 800 in FIG. 8. The encryption process 500 may be implemented in the computer system 900 in FIG. 9. The encryption process 500 may be implemented in the servers 1000, 1050 in FIGS. 10A and 10B, respectively.

The mapping table 505 includes all information regarding deposited data files. If the mapping table 505 is compromised, all the data deposited over the internet can also be compromised. Therefore, it may further increase the security functionality over internet storage by encrypting the mapping table 505 itself. FIG. 5 shows different embodiments of encrypting each individual cells of the mapping table 505.

As shown in FIG. 5, the mapping table 505 includes a plurality of cells 510, 515, 520, 525, 530, 535. In FIG. 5, the notion of Cell [X,Y] means the cell in row X, and column Y. For example, Cell [3,1] means the cell in row 3, and column 1.

When a data file is deposited with an internet storage provider, a cell is created to store all the relevant information regarding the deposited file. The information stored in the cell are later used for retrieving the data file.

Figure 6:
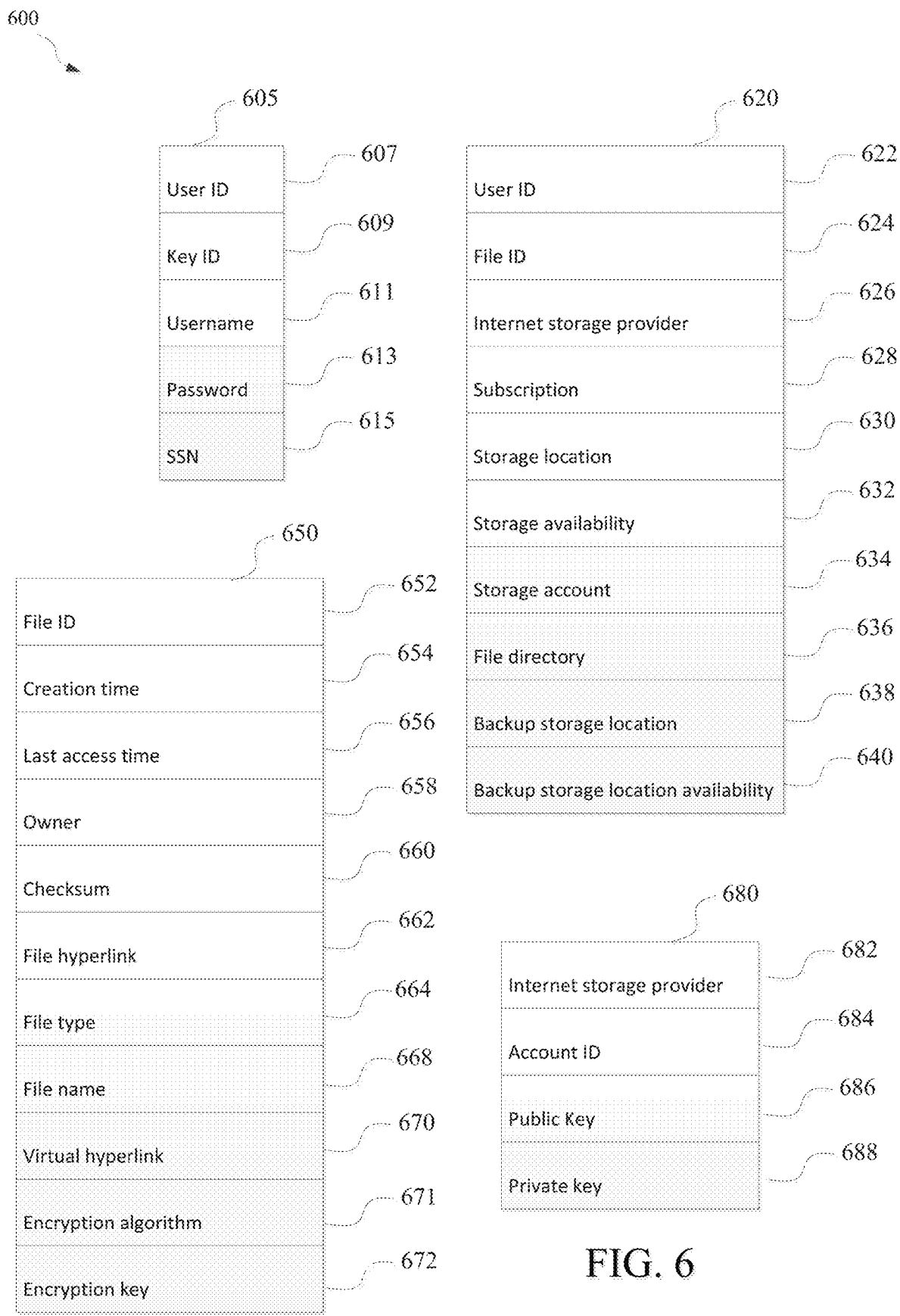
FIG. 6 shows exemplary data structures of a cell of a mapping table according to one embodiment of the disclosure.

Each cell 510, 515, 520, 525, 530, 535 in the mapping table 505 may include all of the information stored in the data structures 600 in FIG. 6. For example, regarding a file stored or to be stored on the internet, one cell may include user ID, key ID, username, password, SSN, File ID, internet storage provider, subscription, storage location, storage location availability, storage account, file directory, backup storage location, backup storage location availability, creation time, last access time, owner, checksum, file hyperlink, file type, file name, virtual hyperlink, encryption algorithm, encryption key, account ID, public key, private key, etc. It is noted that the above mentioned list provides no limitation as to what a cell can contain.

As shown in FIG. 5, an encryption table for the mapping table 550 is provided. The encryption table for the mapping table 550 includes the same number of rows and columns as the mapping table 505. Put in another way, the encryption table for the mapping table 550 has matching cells to the mapping table 505. For example, cell 555 matches cell 510, cell 560 matches cell 515, cell 565 matches cell 520, cell 575 matches cell 530, and cell 580 matches cell 535.

The cells in the encryption table 550 record the encryption algorithms and the encryption keys for the cells in the mapping table 505. Each cell of the mapping table 505 may be encrypted with different encryption algorithms. For example, cell [1,1] 510 may be encrypted with DES 256 bit and key [1,1] as shown in cell 555. In another example, cell [3,1] 530 may be encrypted with AES 256 bit and key [3,1] as shown in cell 575.

In one embodiment, each cell 510, 515, 520, 525, 530, 535 in the mapping table 505 may be re-encrypted following different time schedules. For example, cell 510 may be scheduled for re-encryption in every 10 minutes, cell 515 in every 30 minutes, cell 530 in every 24 hours, etc.

In one embodiment, the re-encrypting frequency for each individual cell may vary. For example, cell 510 may be scheduled for re-encryption in every 10 minute from 9 am to 5 pm, and every one hour from 5 pm to 9 am.

In one embodiment, the selections of encryption algorithms for encrypting the cells in the mapping table 505 is a random process using a probability density function. The random selection process may be similar to the selection process described previously in FIG. 1, FIG. 2, and FIG. 4.

FIG. 6 shows exemplary data structures 600 of a cell of a mapping table according to one embodiment of the disclosure. The data structures 600 may be used by the SCSB 100 in FIG. 1. The data structures 600 may be included in the method 200 in FIG. 2. The data structures 600 may be included in the method 300 in FIG. 3. The data structures 600 may be included in the method 400 in FIG. 4. The data structures 600 may be included in the encryption process 500 for the mapping table 505 in FIG. 5. The data structures 600 may be used in combination with the graphical user interface 700 in FIG. 7. The data structures 600 may be used in the computer network 800 in FIG. 8. The data structures 600 may be used in the computer system 900 in FIG. 9. The data structures 600 may be used in the servers 1000, 1050 in FIGS. 10A and 10B, respectively.

As shown in FIG. 6, the data structure 605 includes user ID 607, key ID 609, username 611, password 613, and SSN 615.

As shown in FIG. 6, the data structure 620 includes user ID 622, file ID 624, internet storage provider 626, subscription 628, storage location 630, storage availability 632, storage account 634, file directory 636, backup storage location 638, and backup storage location availability 640.

As shown in FIG. 6, the data structure 650 includes file ID 652, creation time 654, last access time 656, owner 658, checksum 660, file hyperlink 662, file type 664, file name 668, virtual hyperlink 670, encryption algorithm 671, and encryption key 672.

As shown in FIG. 6, the data structure 680 includes internet storage provider 682, account ID 684, public key 686, and private key 688.

Figure 7:
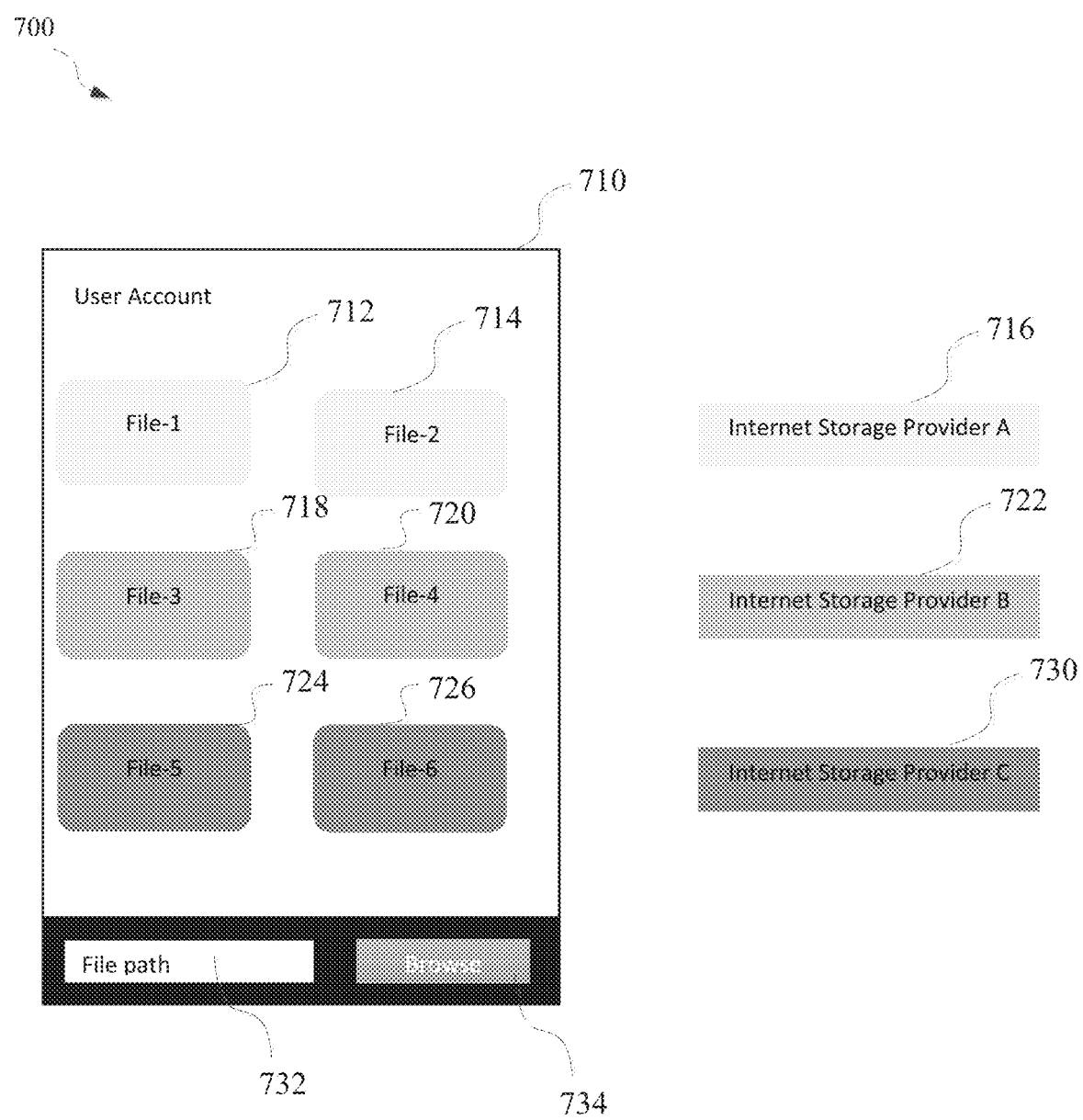
FIG. 7 shows an exemplary graphical user interface (GUI) according to one embodiment of the disclosure.

FIG. 7 shows an exemplary graphical user interface (GUI) 700 according to one embodiment of the disclosure. The GUI 700 may be implemented by the SCSB 100 in FIG. 1. The GUI 700 may be used in combination with the method 200 in FIG. 2. The GUI 700 may be used in combination with the method 300 in FIG. 3. The GUI 700 may be used in combination with the method 400 in FIG. 4. The GUI 700 may be used in combination with the encryption process 500 for the mapping table 505 in FIG. 5. The GUI 700 may be used in combination with the data structures 600 in FIG. 6. The GUI 700 may be implemented with the computer network 800 in FIG. 8. The GUI 700 may be implemented with the computer system 900 in FIG. 9. The GUI 700 may be implemented with the servers 1000, 1050 in FIGS. 10A and 10B, respectively.

As shown in FIG. 7, the GUI 700 includes a main frame 710 showing a user account. The main frame 710 shows the files 712, 714, 718, 720, 724, 726 deposited over the internet. The GUI 700 color codes the files 712, 714, 718, 720, 724, 726 according to which internet storage provided they are deposited.

As shown in FIG. 7, file-1 712 and file-2 714 are color coded as the internet storage provided A 716, indicating that file-1 712 and file-2 714 are stored with the internet storage provider A 716.

As shown in FIG. 7, file-3 718 and file-4 720 are color coded as the internet storage provided B 722, indicating that file-3 718 and file-4 720 are stored with the internet storage provider B 722.

As shown in FIG. 7, file-5 724 and file-6 726 are color coded as the internet storage provided C 730, indicating that file-5 724 and file-6 726 are stored with the internet storage provider C 730.

When a file is selected, the file path bar 732 shows the file path to the file. In one embodiment, the file path may be the file hyperlink disclosed in 240, 320, and 662.

The GUI 700 includes a browse button 734. In one embodiment, when the browse button 734 is clicked, the GUI may refresh the file path bar 732 to show the file path for the most recently selected file.

Figure 8:
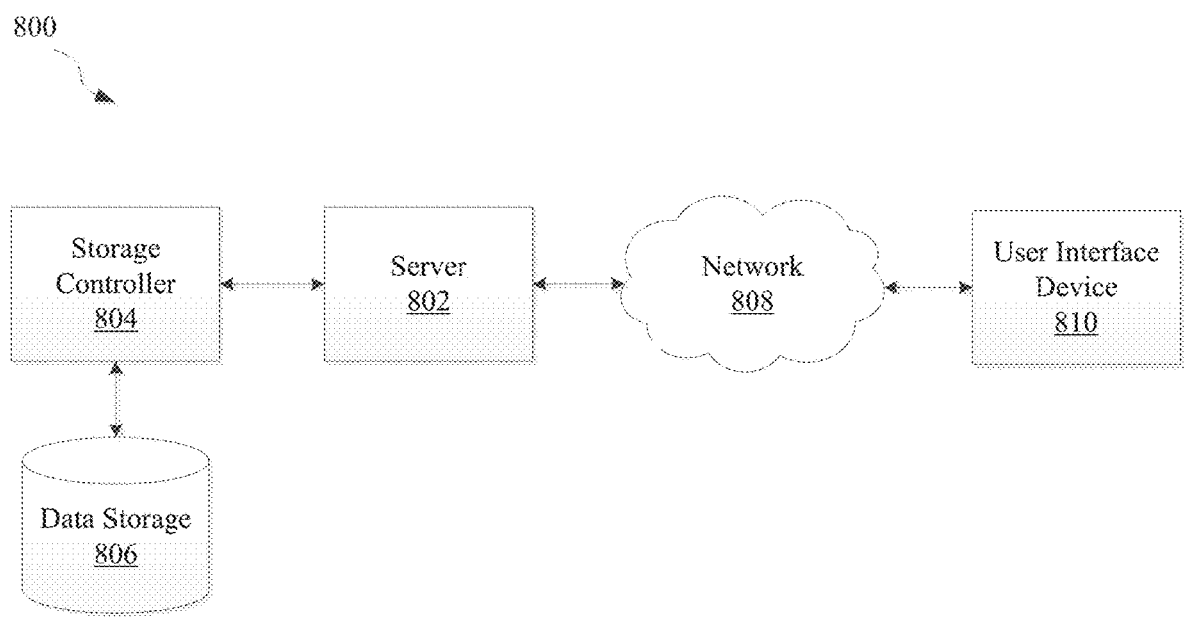
FIG. 8 shows an exemplary block diagram illustrating a computer network according to one embodiment of the disclosure.

FIG. 8 illustrates a computer network 800 for obtaining access to database files in a computing system according to one embodiment of the disclosure. The computer network 800 may include a server 802, a data storage device 806, a network 808, and a user interface device 810. The server 802 may also be a hypervisor-based system executing one or more guest partitions hosting operating systems with modules having server configuration information. In a further embodiment, the computer network 800 may include a storage controller 804, or a storage server configured to manage data communications between the data storage device 806 and the server 802 or other components in communication with the network 808. In an alternative embodiment, the storage controller 804 may be coupled to the network 808.

In one embodiment, the user interface device 810 is referred to broadly and is intended to encompass a suitable processor-based device such as a desktop computer, a laptop computer, a personal digital assistant (PDA) or tablet computer, a smartphone or other mobile communication device having access to the network 808. In a further embodiment, the user interface device 810 may access the Internet or other wide area or local area network to access a web application or web service hosted by the server 802 and may provide a user interface for enabling a user to enter or receive information.

The network 808 may facilitate communications of data between the server 802 and the user interface device 810. The network 808 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 810 accesses the server 802 through an intermediate sever (not shown). For example, in a cloud application the user interface device 810 may access an application server. The application server fulfills requests from the user interface device 810 by accessing a database management system (DBMS). In this embodiment, the user interface device 810 may be a computer or phone executing a Java application making requests to a JBOSS server executing on a Linux server, which fulfills the requests by accessing a relational database management system (RDMS) on a mainframe server.

Figure 9:
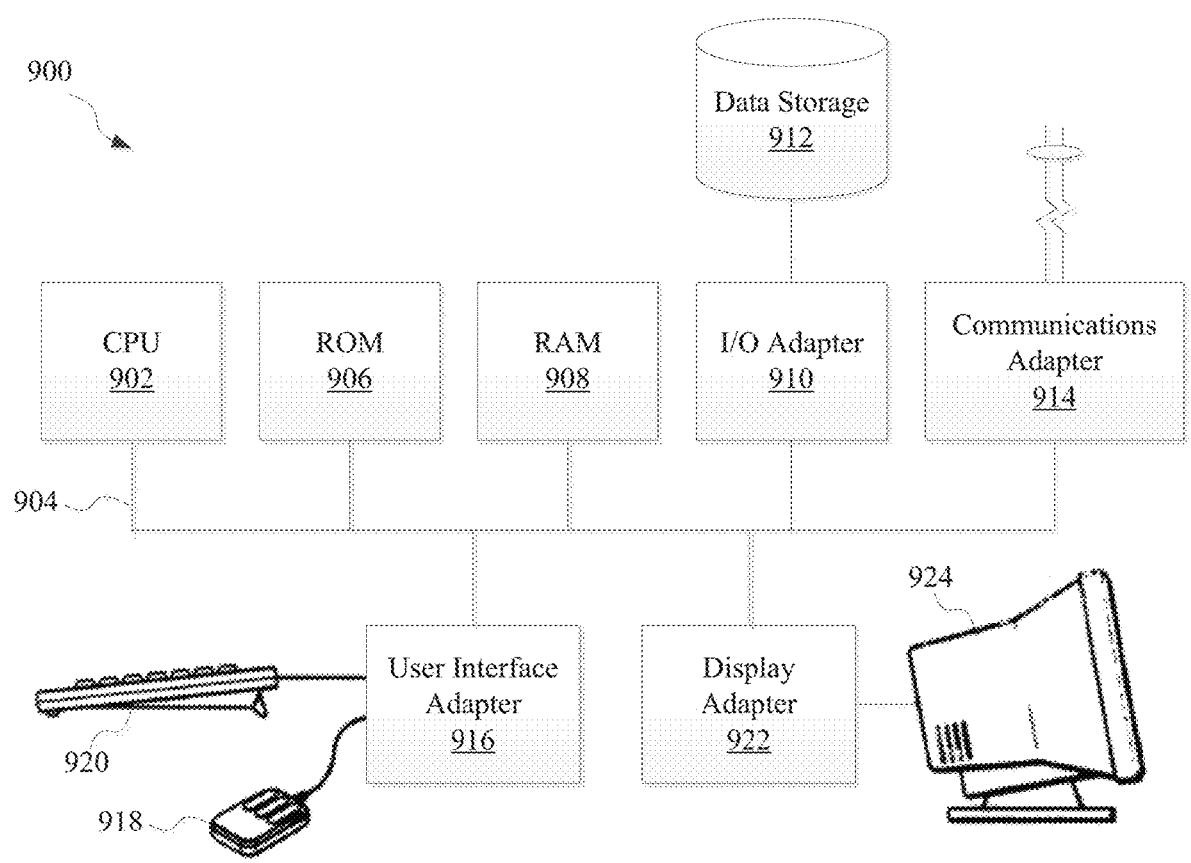
FIG. 9 shows a block diagram illustrating a computer system according to one embodiment of the disclosure.

FIG. 9 illustrates a computer system 900 adapted according to certain embodiments of the server 802 and/or the user interface device 810. The central processing unit ("CPU") 902 is coupled to the system bus 904. The CPU 902 may be a general purpose CPU or microprocessor, graphics processing unit ("GPU"), and/or microcontroller. The present embodiments are not restricted by the architecture of the CPU 902 so long as the CPU 902, whether directly or indirectly, supports the operations as described herein. The CPU 902 may execute the various logical instructions according to the present embodiments.

The computer system 900 may also include random access memory (RAM) 908, which may be synchronous RAM (SRAM), dynamic RAM (DRAM), synchronous dynamic RAM (SDRAM), or the like. The computer system 900 may utilize RAM 908 to store the various data structures used by a software application. The computer system 900 may also include read only memory (ROM) 906 which may be PROM, EPROM, EEPROM, optical storage, or the like. The ROM may store configuration information for booting the computer system 900. The RAM 908 and the ROM 906 hold user and system data, and both the RAM 908 and the ROM 906 may be randomly accessed.

The computer system 900 may also include an I/O adapter 910, a communications adapter 914, a user interface adapter 916, and a display adapter 922. The I/O adapter 910 and/or the user interface adapter 916 may, in certain embodiments, enable a user to interact with the computer system 900. In a further embodiment, the display adapter 922 may display a graphical user interface (GUI) associated with a software or web-based application on a display device 924, such as a monitor or touch screen.

The I/O adapter 910 may couple one or more storage devices 912, such as one or more of a hard drive, a solid state storage device, a flash drive, a compact disc (CD) drive, a floppy disk drive, and a tape drive, to the computer system 900. According to one embodiment, the data storage 912 may be a separate server coupled to the computer system 900 through a network connection to the I/O adapter 910. The communications adapter 914 may be adapted to couple the computer system 900 to the network 808, which may be one or more of a LAN, WAN, and/or the Internet. The user interface adapter 916 couples user input devices, such as a keyboard 920, a pointing device 918, and/or a touch screen (not shown) to the computer system 900. The display adapter 922 may be driven by the CPU 902 to control the display on the display device 924. Any of the devices 902-922 may be physical and/or logical.

The applications of the present disclosure are not limited to the architecture of computer system 900. Rather the computer system 900 is provided as an example of one type of computing device that may be adapted to perform the functions of the server 802 and/or the user interface device 910. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 900 may be virtualized for access by multiple users and/or applications.

Figure 10A:
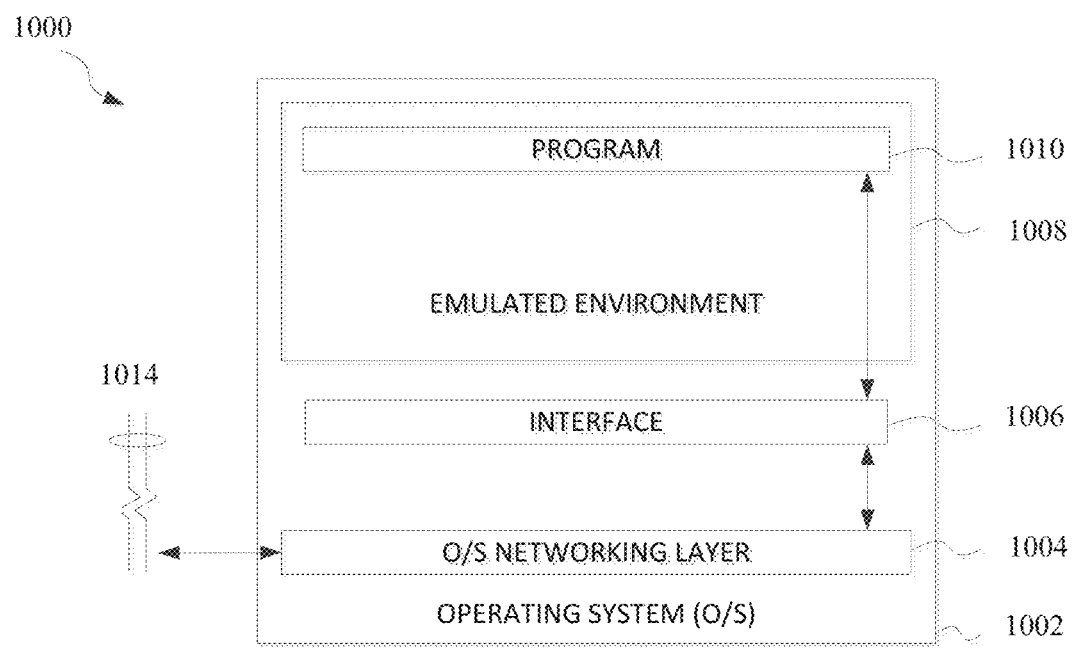
FIG. 10A shows a block diagram illustrating a server hosting an emulated software environment for virtualization according to one embodiment of the disclosure.

FIG. 10A is a block diagram illustrating a server 1000 hosting an emulated software environment for virtualization according to one embodiment of the disclosure. An operating system 1002 executing on a server 1000 includes drivers for accessing hardware components, such as a networking layer 1004 for accessing the communications adapter 1014. The operating system 1002 may be, for example, Linux or Windows. An emulated environment 1008 in the operating system 1002 executes a program 1010, such as Communications Platform (CPComm) or Communications Platform for Open Systems (CPCommOS). The program 1010 accesses the networking layer 1004 of the operating system 1002 through a non-emulated interface 1006, such as extended network input output processor (XNIOP). The non-emulated interface 1006 translates requests from the program 1010 executing in the emulated environment 1008 for the networking layer 1004 of the operating system 1002.

Figure 10B:
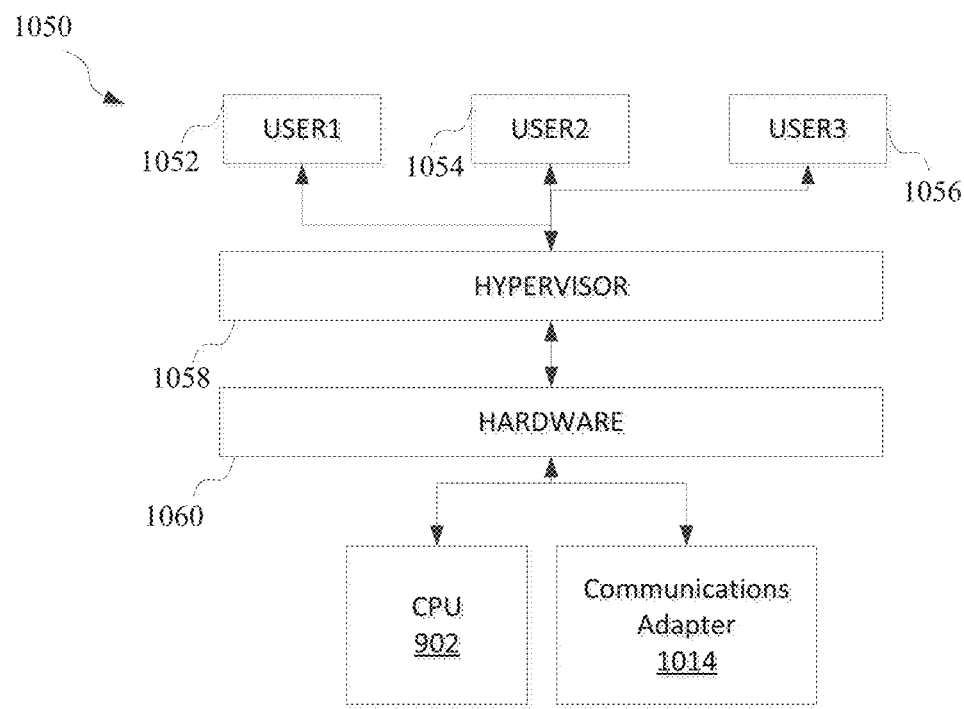
FIG. 10B shows a block diagram illustrating a server hosting an emulated hardware environment according to one embodiment of the disclosure.

In another example, hardware in a computer system may be virtualized through a hypervisor. FIG. 10B is a block diagram illustrating a server 1050 hosting an emulated hardware environment according to one embodiment of the disclosure. Users 1052, 1054, 1056 may access the hardware 1060 through a hypervisor 1058. The hypervisor 1058 may be integrated with the hardware 1058 to provide virtualization of the hardware 1058 without an operating system, such as in the configuration illustrated in FIG. 10A. The hypervisor 1058 may provide access to the hardware 1058, including the CPU 902 and the communications adaptor 1014.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blue-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising steps: receiving, at a processor of a storage broker, a request from a user to deposit data; confirming, by the processor, whether the user provides appropriate credentials; authenticating, by the processor, the request; generating, by the processor, a first unique combination of a randomly selected internet storage provider ID, subscription account, storage location, storage account, and file directory, wherein the first unique combination is generated with a random selection process that follows a first probability density function; generating, by the processor, a second unique combination of a randomly selected file ID, encryption algorithm, and key, wherein the second unique combination is generated with a random selection process that follows a second probability density function; encrypting, by the processor, the data using the encryption algorithm and the key; sending, by the processor, the encrypted data to the file directory for storage; updating, by the processor, a mapping table, wherein the mapping table includes at least one cell, the cell includes the hyperlink, the internet storage provider ID, the subscription account, the storage location, the storage account, the file directory, the file ID, the encryption algorithm, and the key; and reencrypting the mapping table at a varying frequency.

2. The method according to claim 1, further including generating, by the processor, a hyperlink linking to the file directory.

3. The method according to claim 1, further including encrypting, by the processor, the mapping table with an encryption algorithm and a key.

4. The method according to claim 3, further including re-encrypting, by the processor, the mapping table, wherein the process of re-encrypting follows a time schedule, the time schedule includes a fixed re-encrypting frequency.

5. The method according to claim 3, further including generating, by the processor, an encryption table for the mapping table, wherein the encryption table records the encryption algorithm and the key used to encrypt the mapping table.

6. The method according to claim 1, wherein the first and/or second probability density function follows a uniform distribution probability function.

7. A computer program product, comprising: a non-transitory computer-readable medium comprising instructions which, when executed by a processor of a storage broker, causes the processor to perform the steps of: receiving a request from a user to deposit data; confirming whether the user provides appropriate credentials; authenticating the request; generating, by the processor, a first unique combination of a randomly selected internet storage provider ID, subscription account, storage location, storage account, and file directory, wherein the first unique combination is generated with a random selection process that follows a first probability density function; generating, by the processor, a second unique combination of a randomly selected file ID, encryption algorithm, and key, wherein the second unique combination is generated with a random selection process that follows a second probability density function; encrypting the data using the encryption algorithm and the key; sending the encrypted data to the file directory for storage; updating a mapping table, wherein the mapping table includes at least one cell, the cell includes the hyperlink, the internet storage provider ID, the subscription account, the storage location, the storage account, the file directory, the file ID, the encryption algorithm, and the key; and reencrypting the mapping table at a varying frequency.

8. The computer program product of claim 7, the steps further including generating a hyperlink linking to the file directory.

9. The computer program product of claim 7, the steps further including encrypting the mapping table with an encryption algorithm and a key.

10. The computer program product of claim 9, the steps further including re-encrypting the mapping table, wherein the process of re-encrypting follows a time schedule, the time schedule includes a fixed re-encrypting frequency.

11. The computer program product of claim 9, the steps further including generating an encryption table for the mapping table, wherein the encryption table records the encryption algorithm and the key used to encrypt the mapping table.

12. The computer program product of claim 7, wherein the first and/or second probability density function follows a uniform distribution probability function.

13. An apparatus, comprising: a memory; and a processor of a storage broker coupled to the memory, the processor being configured to perform the steps of: receiving a request from a user to deposit data; confirming whether the user provides appropriate credentials; authenticating the request; generating, by the processor, a first unique combination of a randomly selected internet storage provider ID, subscription account, storage location, storage account, and file directory, wherein the first unique combination is generated with a random selection process that follows a first probability density function; generating, by the processor, a second unique combination of a randomly selected file ID, encryption algorithm, and key, wherein the second unique combination is generated with a random selection process that follows a second probability density function; encrypting the data using the encryption algorithm and the key; sending the encrypted data to the file directory for storage; updating a mapping table, wherein the mapping table includes at least one cell, the cell includes the hyperlink, the internet storage provider ID, the subscription account, the storage location, the storage account, the file directory, the file ID, the encryption algorithm, and the key; and reencrypting the mapping table at a varying frequency.

14. The apparatus of claim 13, the steps further including generating a hyperlink linking to the file directory.

15. The apparatus of claim 13, the steps further including encrypting the mapping table with an encryption algorithm and a key.

16. The apparatus of claim 15, the steps further including re-encrypting the mapping table, wherein the process of re-encrypting follows a time schedule, the time schedule includes a fixed re-encrypting frequency.

17. The apparatus of claim 15, the steps further including generating an encryption table for the mapping table, wherein the encryption table records the encryption algorithm and the key used to encrypt the mapping table.

* * * * *